United States Patent [19]

Vonk et al.

[11] Patent Number: 4,904,713
[45] Date of Patent: Feb. 27, 1990

[54] BITUMINOUS COMPOSITION

[75] Inventors: Willem C. Vonk; Hendrik J. Brouwer; Anthony L. Bull, all of Amsterdam, Netherlands

[73] Assignee: Shell Oil Company, Houston, Tex.

[21] Appl. No.: 293,532

[22] Filed: Dec. 30, 1988

Related U.S. Application Data

[63] Continuation of Ser. No. 156,498, Feb. 16, 1988, abandoned.

[30] Foreign Application Priority Data

Feb. 16, 1987 [GB] United Kingdom ................. 8703548

[51] Int. Cl.$^4$ .................. C08L 53/02; C08L 95/00
[52] U.S. Cl. ..................................... 524/68; 523/222; 524/71; 524/505
[58] Field of Search ........................................... 524/68

[56] References Cited

U.S. PATENT DOCUMENTS

| | | |
|---|---|---|
| 3,978,014 | 8/1976 | van Beem et al. ................... 524/505 |
| 4,464,427 | 8/1984 | Barlow ................................... 524/68 |
| 4,585,816 | 4/1986 | Vitkuske et al. ..................... 523/351 |
| 4,609,697 | 9/1986 | Albers ................................... 524/68 |
| 4,738,996 | 4/1988 | Vonk et al. ........................... 524/68 |

Primary Examiner—John C. Bleutge
Assistant Examiner—David W. Woodward

[57] ABSTRACT

Bituminous composition comprising a bitumen, an elastomeric, optionally hydrogenated, block copolymer containing at least two alkenyl arene blocks A and at least one conjugated diene block B, and a polymer of a monoalkenyl arene of which polymer the number average molecular weight is the range of 0.25 to 2 times the number average molecular weight of the polymeric blocks A.

16 Claims, No Drawings

BITUMINOUS COMPOSITION

This is a continuation, of application Ser. No. 156,498, filed Feb. 16, 1988, now abandoned.

FIELD OF THE INVENTION

The present invention relates to a bituminous composition especially suitable in roofing coatings, comprising a bitumen, at least one elastomeric, optionally hydrogenated, block copolymer of an alkenyl arene and a conjugated diene, and a polymer of a monoalkenyl arene.

BACKGROUND

Such bituminous compositions have excellent elasticity, flexibility and adhesion properties, which render them especially suitable for use in roofing coatings. However, the resistance to flow of these compositions could do with some improvement.

SUMMARY OF THE INVENTION

It has now surprisingly been found that the addition of another polymer to the known bituminous compositions yields compositions combining excellent flexibility, adhesion and flow resistance properties with low viscosity and much improved storage stability. Accordingly, the present invention provides a bituminous composition comprising.

(a) a bitumen;
(b) at least one elastomeric block copolymer, wherein the elastomeric block copolymer is selected from the group consisting of unsaturated and hydrogenated block copolymers, the unsaturated block copolymer and the hydrogenated block copolymer prior to hydrogenation comprising
  (1) at least two polymer blocks A, the block A being predominantly a polymerized alkenyl arene block, and
  (2) at least one polymer block B, the block B being predominantly a polymerized conjugated diene block,
  (3) wherein the at least one block B is between the at least two blocks A; and
(c) a polymer of a monoalkenyl arene, the polymer having a number average molecular weight in the range of 0.25 to 2 times the number average molecular weight of the block A.

DETAILED DESCRIPTION

The bitumen used can be selected from any bitumen from natural or pyrogenous origin. Preferably, the bitumen is derived from a mineral oil. Suitable bitumen components derived from a mineral oil include a long residue, a short residue, a thermally cracked residue, precipitation bitumen or the blown product of each of the mentioned components. Propane or butane bitumen or blown propane or butane bitumen is very suitable, while mixtures of bitumen components can also be used. Also mixtures of bitumens and extender oils can be employed as bitumen component.

Suitable bitumen components employed in the composition according to the invention include those having a penetration as high as 450 dmm at 25° C., and preferably in the range from 50 to 250 dmm at 25° C. This property is determined according to ASTM-D5.

It will be understood that both blocks A and B may be either homopolymer, random or tapered copolymer blocks as long as each block predominates in at least one class of the monomers characterizing the blocks defined hereinbefore. For example, blocks A may comprise styrene/alpha-methylstyrene copolymer blocks or styrene/butadiene random or tapered copolymer blocks as long as the blocks individually predominate in alkenyl arenes. The A blocks are preferably monoalkenyl arene. The term "monoalkenyl arene" will be taken to include particularly those of the benzene series such as styrene and its analogs and homolog including o-methylstyrene, p-methylstyrene, p-tert-butylstyrene, 1,3-dimethylstyrene, alpha-methylstyrene and other ring alkylated styrenes having at least one alkyl substituent of up to 6 carbon atoms, for example ring-methylated styrenes, and other monoalkenyl polycyclic arenes such as isopropenyl naphthalene, vinyl naphthalene, vinyl anthracene and the like. The preferred monoalkenyl arenes are monovinyl monocyclic arenes such as styrene and alpha-methylstyrene, and styrene is particularly preferred.

The blocks B may comprise homopolymers of conjugated diene monomers, copolymers of two or more conjugated dienes, and copolymers of one of the dienes with a moonoalkenyl arene as long as the blocks B predominate in conjugated diene units. The conjugated dienes are preferably ones containing from 4 to 8 carbon atoms. The conjugated dienes are preferably ones containing from 4 to 8 carbon atoms. Examples of such suitable conjugated diene monomers include: 1,3-butadiene (butadiene), 2-methyl-1,3-butadiene (isoprene), 2,3-dimethyl-1,3-butadiene, 1,3-pentadiene (piperylene), 1,3-hexadiene, and the like. Mixtures of such conjugated dienes may also be used. The preferred conjugated dienes are butadiene and isoprene.

The polymeric blocks A in the elastomeric, optionally hydrogenated, block copolymer preferably have number average molecular weights of 5,000 to 50,000, more preferably from 10,000 to 35,000. It is preferred that the proportion of the polymeric blocks A in the block copolmer lies in the range of 10 to 60%w, more preferably from 20 to 50%w. Higher proportions of alkenyl arenes in the block copolymer could give rise to compatibility problems with the bitumen. These compatibility porblems may vary from the formation of very viscous compositions that are difficult to handle to compositions from which the polymer of the monoalkenyl arene separates into a discrete phase. Therefore, it is very surprising that in the present invention the addition of a polymer of a monoalkenyl arene does not involve any compatibility problem and that it even improves the flow resistance and storage stability. The polydiene block (or blocks) B has (have) preferably a number average molecular weight of 15,000 to 350,000, more preferably from 25,000 to 150,000.

Suitable elastomeric block copolymers include linear, branched and star-shaped (radial) block copolymers. As terminal blocks of the copolymer, preferably the polymeric blocks A are used. So, suitable linear copolymers can be represented by the formula A—B—(—B—A)$_n$, in which n is an integer and preferably ranges from 1 to 20, more preferably 1 to 5, and suitable branched or star-shaped copolymer can be represented by the formula A—B—(-B—A)$_m$ in which m is an integer preferably from 2 to 20. Any of these copolymers may or may not contain coupling agent residues included during their preparation.

Extremely useful block copolymers are linear block copolymers having the configuration A—B—A, i.e. n is 1, and star-shaped block copolymers of configuration A—B—(—B—A)$_m$ in which m is from 2 to 8.

The preparation of the block copolymer is known in the art. In British patent specification No. 1,538,266 a number of methods are described. For the preparation of star-shaped copolymers, use can be made of suitable coupling agents such as diesters, like adipates, phosphites or silicon-compounds or a nucleus prepared by oligomerization of di- or tri-vinyl benzene. Other coupling agents can be selected from polyepoxides, such as epoxidized linseed oil, polyisocyanates, e.g. benzo-1,2,4-triisocyante, polyketones e.g. hexane-1,3,6-trione, polyanhydrides or polyhalides. Especially when oligomers of di- or trivinyl benzene are used as coupling agents, the resulting star-shaped copolymer can have a large number of polymeric arms, e.g. 7-20 arms. The hydrogenation of the block copolymer, if desired, may be carried out as described in the above British patent specification.

The monomer used in the preparation of the polymer of the monoalkenyl arene can be selected from the same monomers as used in the blocks A of the block copolymer.

Again, styrene is particularly preferred. The polymer can be a homopolymer or a copolymer of more than one monoalkenyl arene. Preferably the polymer is a homopolymer, and in particular polystyrene.

Preferably, the number average molecular weight of the polymer is 3,000 to 50,000, more preferably 5,000 to 40,000. It is observed that the molecular weight of this polymer must be chosen such that it fulfills the requirement that its molecular weight is from 0.25 to 2 times the molecular weight of the polymeric blocks A. Advantageously, the molecular weight is chosen such that the number average molecular weight of the polymer is from 0.4 to 1.5 times the molecular weight of the polymeric blocks A. In a practically very suitable situation, the molecular weight of the polymer and the polymeric blocks A are about the same.

The polymer can be prepared by free-radical, anionic, cationic and coordination catalysis mechanisms. Free-radical and cationic mechanisms yield polymers with a high degree of random placement of the aromatic group relative to the backbone, i.e. these polymers are classified as amorphous. Polymers obtained by anionic mechanisms are usually amorphous, though under special conditions isotactic polymers can be prepared. Polymers prepared by coordination catalysis comprise mixtures of amorphous and isotactic polymers. Another known suitable polymerization technique is emulsion polymerization, as those skilled in the art will appreciate.

The polymer can also advantageously be produced by simultaneously manufacturing this polymer and the elastomeric block copolymer. The first step of this process involves contacting a monovinyl arene, such as a monovinyl monocyclic arene, and an initiator to form living polymers A. Suitable initiators include alkyllithium compounds. In the next step less than the stoichiometric amount of terminating agent required to kill all radicals is added to the reaction mixture. This results in the formation of polymers of monoalkenyl arene. There will remain, however, living polymer blocks in the reaction mixture. Typical terminating agents are water or alcohols. The living polymer blocks are then contacted with a conjugated diene. The then resulting living two-block intermediates can then be coupled to yield linear or branched or star-shaped copolymers, depending on the coupling agent used. Alternatively, additional A and/or B blocks may be grown via sequential addition of the respective monomer to produce a linear polymer, e.g., A—B—A, A—B—A—B, etc.

The composition according to the present invention can conveniently be prepared by mixing the bitumen, the elastomeric block copolymer and the polymer of a monoalkenyl arene. It is submitted that the composition obtained is different from a composition obtained by reacting a bituminous material with an monoalkenyl arene and the elastomeric block copolymer. In the latter case the monoalkenyl arene reacts with unsaturated bonds in the elastomeric copolymer and components of the bituminous material, resulting in the crosslinking of the bituminous material with the elastomeric block copolymer. In this way, no composition is obtained which contains a neatly defined block copolymer and a neatly defined polymer of the monoalkenyl arene.

The amounts of the elastomeric block copolymer and the polymer of a monoalkenyl arene in the composition according to the present invention can vary within wide ranges. Preferably the composition contains from 1 to 20%w of the elastomeric block copolymer and from 0.25 to 15%w of the polymer of the monoalkenyl arene, all weight percentages being based on the total weight of the bitumen, the elastomeric block copolymer and the polymer of the monoalkenyl arene. The weight ratio of the elastomeric block copolymer to the polymer of the monoalkenyl arene is preferably from 2:1 to 20:1.

The composition according to the present invention is extremely suitable as roofing material. The invention therefore further relates to the use of such a composition as a roofing coating. It is observed that the material can also be used in road asphalt, pipe coatings, mastics and the like. When the composition is used in road asphalt, the amount of the polymers will normally be 1-10%w; in pipe coatings, 5-15%w; in mastics, 5-15%w; and in roofing coatings, 4-20%w, based on the total of bitumen and the two polymers. When used as a roofing coating, the composition is suitably employed in combination with a reinforcement. This reinforcement may comprise woven or unwoven fabrics or chopped fibres. The fibres are preferably comprised of glass or polyester. The composition may further contain fillers, extenders, pigments or plasticizers.

The composition according to the present invention is suitably heated and applied to the fibres. Hence it is possible to prepare preformed membranes of the composition with a reinforcement. However, membranes consisting of the composition, i.e. without reinforcements, can also be prepared. Either type of membrane can be used as protective coating by applying the membranes onto a surface using heat and/or an adhesive, which adhesive can be relatively soft bitumen, or by other means known to those skilled in the art. The present composition can also be taken up in an emulsion, the emulsion can be sprayed onto the surface to be coated and after breaking of the emulsion a coating remains.

The invention will further be illustrated by means of the following Examples.

EXAMPLES

In the experiments of the Examples two bitumens I and II were used each with a penetration of 200 dmm at 25° C., bitumen I being a Venezuelan bitumen and bitumen II being a Middle East bitumen. As elastomeric block copolymer a star-shaped polymer of styrene (A) and butadiene (B) was used, the polymer having an average number of 3.5 arms of structure A—B, in which the blocks A have a number average molecular weight of 21,000 and in which the styrene content is 30%w. The polystyrene used was prepared by anionic polymerization unless otherwise indicated. Polystryene with different molecular weights were employed.

The properties tested included the softening point ($T_{R\&B}$) of the mixtures (ASTM D36), the viscosity of the mixtures (ASTM D2171) and a resistance to flow and a cold bend test in accordance with German standard DIN 52123. According to this standard, the mixture must pass a cold bend test at $-15°$ C. and a flow resistance test at $100°$ C. The procedure of this standard was modified to the extent that for the mixtures the highest temperatures at which they passed the flow resistance test, were recorded. The temperature intervals between the flow resistance tests were $5°$ C.

For some mixtures the storage stability was determined. Thereto a can of 10 cm height, was filled with the mixtures under nitrogen, the can was sealed, stored at $160°$ C. for 5 days; then the can was sawed into halves, yielding a top fraction and a bottom fraction. The softening points of both fractions were determined, the value of the bottom fraction was deducted from that of the top fraction and the difference was recorded ($\Delta T_{R\&B}$ (top-bottom)). The smaller the difference, the better was the storage stability.

Example I

Mixtures were prepared of bitumen I (B-I), the elastomeric block copolymer (EBC), and polystyrene (PS) with a number average molecular weight of 15,000. The amounts of the components, and the properties of the mixtures are indicated in Table I.

TABLE I

| | | | | |
|---|---|---|---|---|
| B-I, pbw* | 88 | 88 | 90 | 90 |
| EBC, pbw* | 12 | 12 | 10 | 10 |
| PS, pbw* | 0 | 2.4 | 0 | 2.4 |
| $T_{R\&B}$, °C. | 127.5 | 133.5 | 120 | 127 |
| Flow resistance, °C. | 105 | 120 | 95 | 115 |
| Cold bend at $-15°$ C. | pass | pass | pass | pass |
| Viscosity at 180° C. Pa.s | 2.7 | 2.5 | 1.9 | 1.5 |
| Storage stability | | | | |
| $\Delta T_{R\&B}$ (top-bottom), °C. | >17 | 4 | >17 | 15 |

*Parts by weight based on B-I plus EBC.

Examples 2

To show the effect of the molecular weight of the polystyrene, mixtures with the bitumens I and II, and with polystyrene having different molecular weights were prepared. Composition of the mixtures and their properties are represented in Table II.

TABLE II

| | | | | | | |
|---|---|---|---|---|---|---|
| B-I, % w | — | — | — | — | — | |
| B-II, % w | 88.0 | 88.0 | 88.0 | 88.0 | 88.0 | |
| EBC, % w | 12.0 | 10.8 | 9.6 | 10.8 | 9.6 | |
| PS, % w | 0 | 1.2 | 2.4 | 1.2 | 2.4 | |
| mol. weight PS, × 10³ | — | 10 | 10 | 20 | 20 | |
| $T_{R\&B}$, °C. | 117.5 | 120 | 118 | 119 | 115 | |
| Viscosity, Pa.s | 4.0 | 3.1 | 2.2 | 3.1 | 2.3 | |
| Flow resistance, °C. | 95 | 105 | 105 | 105 | 100 | |
| Cold bend at $-15°$ C. | pass | pass | pass | pass | pass | |
| B-I, % w | — | 88.8 | 88.8 | 88.0 | 88.0 | 88.0 |
| B-II, % w | 88.0 | — | — | — | — | — |
| EBC, % w | 10.8 | 12.0 | 10.8 | 9.6 | 10.8 | 9.6 |
| PS, % w | 1.2* | 0 | 1.2 | 2.4 | 1.2 | 2.4 |
| mol. weight PS, × 10³ | 30 | — | 10 | 10 | 20 | 20 |
| $T_{R\&B}$, °C. | 120 | 126 | 125 | 124 | 126 | 125 |
| Viscosity, Pa.s | 2.9 | 2.0 | 1.5 | 1.3 | 1.4 | 1.3 |
| Flow resistance, °C. | 100 | 100 | 105 | 110 | 115 | 110 |
| Cold bend at $-15°$ C. | pass | pass | pass | pass | pass | pass |
| B-I, % w | | 86.0 | 86.0 | 86.0 | 86.0 | 86.0 |
| B-II, % w | | — | — | — | — | — |
| EBC, % w | | 14.0 | 12.6 | 11.2 | 12.6 | 11.2 |
| PS, % w | | 0 | 1.4 | 2.8 | 1.4 | 2.8 |
| mol. weight PS, × 10³ | | — | 10 | 10 | 20 | 20 |
| $T_{R\&B}$, °C. | | 132 | 134 | 132 | 133 | 136 |
| Viscosity, Pa.s | | 4.4 | 2.4 | 1.6 | 3.2 | 2.0 |
| Flow resistance, °C. | | 110 | 115 | 120 | 125 | 130 |
| Cold bend at $-15°$ C. | | pass | pass | pass | pass | pass |
| B-I % w | — | — | — | — | — | — | — |
| B-II % w | 86.0 | 86.0 | 86.0 | 86.0 | 86.0 | 86.0 | 86.0 |
| EBC % w | 14.0 | 12.6 | 11.2 | 12.6 | 11.2 | 12.6 | 11.2 |
| PS % w | 0 | 1.4 | 2.8 | 1.4 | 2.8 | 1.4* | 2.8* |
| mol. weight PS, × 10³ | — | 10 | 10 | 20 | 20 | 30 | 30 |
| $T_{R\&B}$, °C. | 125 | 125 | 126 | 127 | 125.5 | 125.5 | 128 |
| Viscosity, Pa.s | 7.2 | 5.6 | 3.8 | 5.6 | 4.1 | 5.6 | 3.9 |
| Flow resistance, °C. | 105 | 105 | 110 | 115 | 115 | 105 | 120 |
| Cold bend at $-15°$ C. | pass | pass | pass | pass | pass | pass | pass |

*PS prepared by emulsion polymerization

What is claimed is:

1. A bituminous composition comprising:
(a) a bitumen;
(b) at least 1.0 percent by weight of at least one elastomeric block copolymer, wherein said elastomeric block copolymer is selected from the group consisting of unsaturated and hydrogenated block copolymers, said unsaturated block copolymer and said hydrogenated block copolymer prior to hydrogenation comprising
(1) at least two polymer blocks A, said block A being predominantly a polymerized alkenyl arene block having a number average molecular weight within the range of about 10,000 to 35,000, and
(2) at least one polymer block B, said block B being predominantly a polymerized conjugated diene block,
(3) wherein said at least one block B is between said at least two blocks A; and
(c) at least 0.25 percent by weight of a monoalkenyl arene polymer, said monoalkenyl arene polymer selected from the group consisting of a homopolymer of a monoalkenyl arene and a copolymer consisting essentially of more than one monoalkenyl arene and said monoalkenyl arene polymer having a number average molecular weight in the range of 0.4 to 1.5 times the number average molecular weight of said blocks A and said monoalkenyl-arene polymer having a number average molecular weight within the range of 10,000 to 40,000 and the amount of component (b) plus the amount of compnent (c) in the composition is within the range of about 1.25 to 15% by weight where the percent by weights are based on the total amount of components (a), (b) and (c).

2. The composition according to claim 1, wherein said bitumen has a penetration of at most 450 dmm at 25° C.

3. The composition according to claim 2, wherein said bitumen has a penetration from 50 to 250 dmm at 25° C.

4. The composition according to claim 1, wherein said block B is selected from the group consisting of polymerized isoprene, polymerized butadiene, and polymerized isoprene and butadiene copolymer.

5. The composition according to claim 1, wherein said blocks A constitute 10 to 60 percent by weight of said elastomeric block copolymer.

6. The composition according to claim 5, wherein said block A is polymerized styrene.

7. The composition according to claim 1, wherein said elastomeric block copolymer is a linear block copolymer having the configuration A—B—A.

8. The composition according to claim 1, wherein said elastomeric block copolymer is a star-shaped block copolymer having the configuration A—B-(-B—A)m, where m is an integer from 2 to 8.

9. The composition according to claim 1, wherein said monoalkenyl arene polymer is polystyrene.

10. The composition according to claim 6, wherein said block B is polymerized butadiene.

11. The composition according to claim 10, wherein said elastomeric block copolymer is an unsaturated block copolymer.

12. An article of manufacture comprising a composition according to claim 1.

13. The article of manufacture according to claim 12, further comprising a reinforcement for said composition, wherein said reinforcement is selected from the group consisting of woven fabrics, unwoven fabrics, and chopped fibers.

14. An article of manufacture comprising a composition according to claim 11.

15. The article of manufacture according to claim 14, further comprising a reinforcement for said composition, wherein said reinforcement is selected from the group consisting of woven fabrics, unwoven fabrics, and chopped fibers.

16. The composition of claim 1 wherein the monoalkenyl arene polymer has a number average molecular weight about equal to the number average molecular weight of the A blocks.

* * * * *